United States Patent
Lu et al.

(10) Patent No.: US 9,249,808 B2
(45) Date of Patent: Feb. 2, 2016

(54) FAN MODULE

(71) Applicants: Inventec (Pudong) Technology Corporation, Shanghai (CN); Inventec Corporation, Taipei (TW)

(72) Inventors: Chun-Ming Lu, Taipei (TW); Wen-Cheng Hu, Taipei (TW); Chun-Ying Yang, Taipei (TW); Yen-Cheng Lin, Taipei (TW); Ming-Hung Shih, Taipei (TW); Ying-Chao Peng, Taipei (TW)

(73) Assignees: INVENTEC (PUDONG) TECHNOLOGY CORPORATION, Shanghai (CN); INVENTEC CORPORATION, Taipei (TW)

( * ) Notice: Subject to any disclaimer, the term of this patent is extended or adjusted under 35 U.S.C. 154(b) by 404 days.

(21) Appl. No.: 13/794,962

(22) Filed: Mar. 12, 2013

(65) Prior Publication Data
US 2014/0140816 A1      May 22, 2014

(30) Foreign Application Priority Data

Nov. 20, 2012   (CN) .......................... 2012 1 0470807

(51) Int. Cl.
| | |
|---|---|
| F04D 29/00 | (2006.01) |
| F04D 29/66 | (2006.01) |
| F16F 15/02 | (2006.01) |
| G06F 1/20 | (2006.01) |
| F04D 25/06 | (2006.01) |
| F04D 29/60 | (2006.01) |

(52) U.S. Cl.
CPC .......... *F04D 29/668* (2013.01); *F04D 25/0613* (2013.01); *F04D 29/601* (2013.01); *F16F 15/02* (2013.01); *G06F 1/20* (2013.01)

(58) Field of Classification Search
CPC ..... F04D 19/002; F04D 29/52; F04D 29/646; F04D 29/668
See application file for complete search history.

(56) References Cited

U.S. PATENT DOCUMENTS

| | | | | | |
|---|---|---|---|---|---|
| 2,823,598 | A | * | 2/1958 | Jenn ............................... | 454/346 |
| 4,964,787 | A | * | 10/1990 | Hoover ......................... | 417/363 |
| 5,906,475 | A | * | 5/1999 | Melane et al. ............. | 415/214.1 |
| 7,290,992 | B2 | * | 11/2007 | Palluat de Besset et al. . | 417/360 |
| 7,306,425 | B2 | * | 12/2007 | Park et al. ..................... | 415/119 |
| 2013/0272868 | A1 | * | 10/2013 | Sun ............................. | 415/213.1 |

* cited by examiner

*Primary Examiner* — Nathan J Newhouse
*Assistant Examiner* — Christopher Bobish
(74) *Attorney, Agent, or Firm* — Huffman Law Group, PC

(57) ABSTRACT

A fan module includes a casing, a fan, and two vibration absorption assemblies. The casing has an accommodating space. The fan is located in the accommodating space and keeps a distance from the casing. Each of the two vibration absorption assemblies includes two first vibration absorption components and a second vibration absorption component. The two first vibration absorption components are respectively in contact with the fan and separated from the casing, respectively. The second vibration absorption component is connected with two first vibration absorption components and the casing, respectively. The first vibration absorption components and the second vibration absorption components are adapted for absorbing the vibration waves having different frequency ranges.

6 Claims, 6 Drawing Sheets

FAN MODULE

CROSS-REFERENCE TO RELATED APPLICATIONS

This non-provisional application claims priority under 35 U.S.C. §119(a) on Patent Application No(s). 201210470807.2 filed in China on Nov. 20, 2012, the entire contents of which are hereby incorporated by reference.

BACKGROUND OF THE INVENTION

1. Technical Field of the Invention

The disclosure relates to a heat dissipation device, and more particularly to a fan module.

2. Description of the Related Art

A computer system (e.g. a personal computer or a server host) generates exhaust heat during operation, and the amount of the exhaust heat varies, depending on the operating time and the efficiency of the computer system. When the exhaust heat is gradually accumulated in the computer system, the internal temperature of the computer system will rise, thereby affecting the operating efficiency of the computer system, even causing a system crash. Therefore, a computer system may be provided with a heat dissipation device (e.g. a fan) to dissipate the exhaust heat generated during operation.

However, the rotation of the fan may cause vibration, and the vibration amplitude increases when the rotation speed of fan increases. This vibration has an influence on the performance of internal electronic components of the computer system. For a server, the fan is usually fixed to the server's chassis, so the vibration caused by the rotation of the high-speed fan is thus transferred to such peripherals as the hard disks, which affects the performance of these peripherals, and may even damage them. As a result, the vibration problem caused by fan rotation needs to be addressed.

SUMMARY OF THE INVENTION

An embodiment of the disclosure provides a fan module comprising a casing, a fan, and two vibration absorption assemblies. The casing has an accommodating space. The fan is located in the accommodating space and keeps a distance from the casing. Each of the two vibration absorption assemblies comprises two first vibration absorption components and a second vibration absorption component. The two first vibration absorption components are respectively in contact with the fan and separated from the casing respectively. The second vibration absorption component is connected with two first vibration absorption components and the casing respectively. The first vibration absorption components and the second vibration absorption components are adapted for absorbing vibration waves in different frequency ranges.

BRIEF DESCRIPTION OF THE DRAWINGS

The disclosure will become more fully understood from the detailed description given herein below for illustration purposes only, and thus does not limit the present disclosure, wherein.

DETAILED DESCRIPTION

Figure 1:
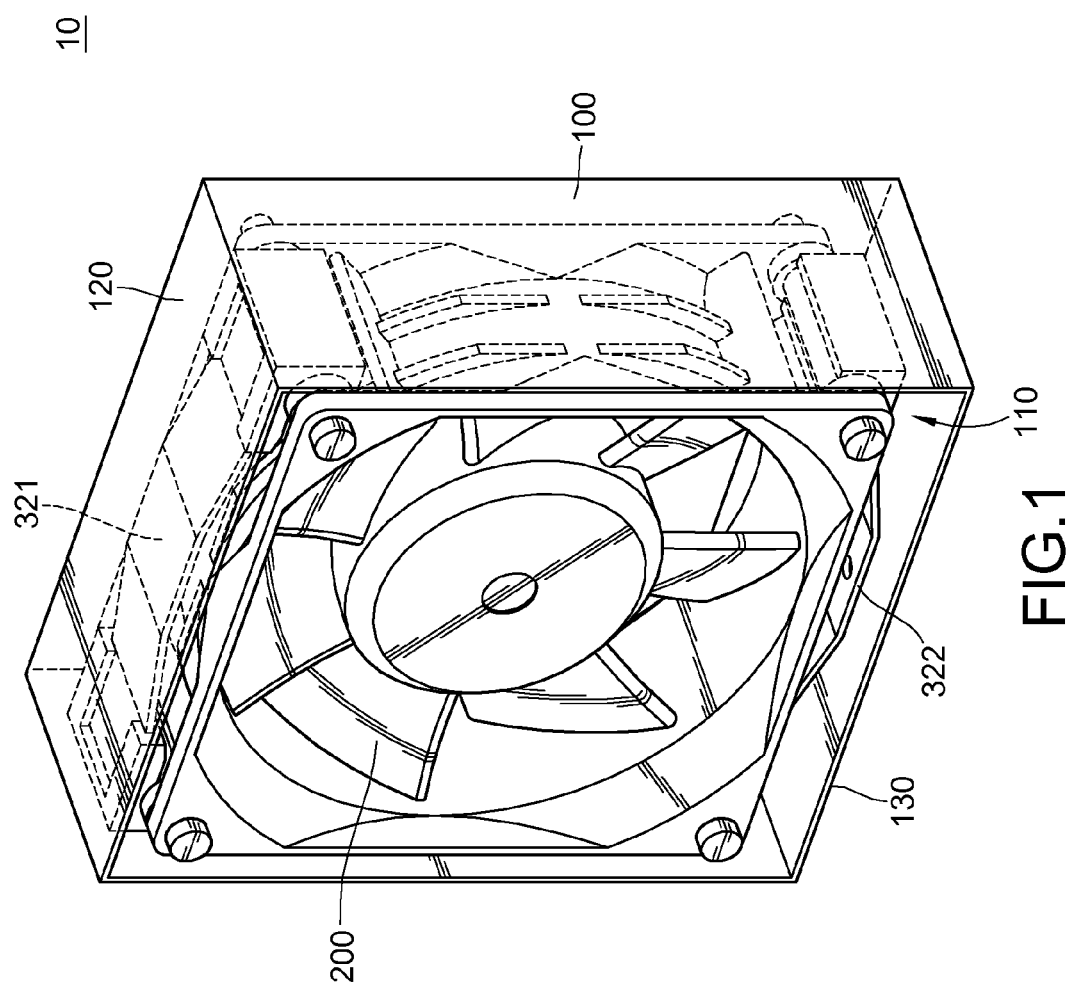
FIG. 1 is a schematic perspective view of a fan module according to one embodiment of the disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Figure 2:
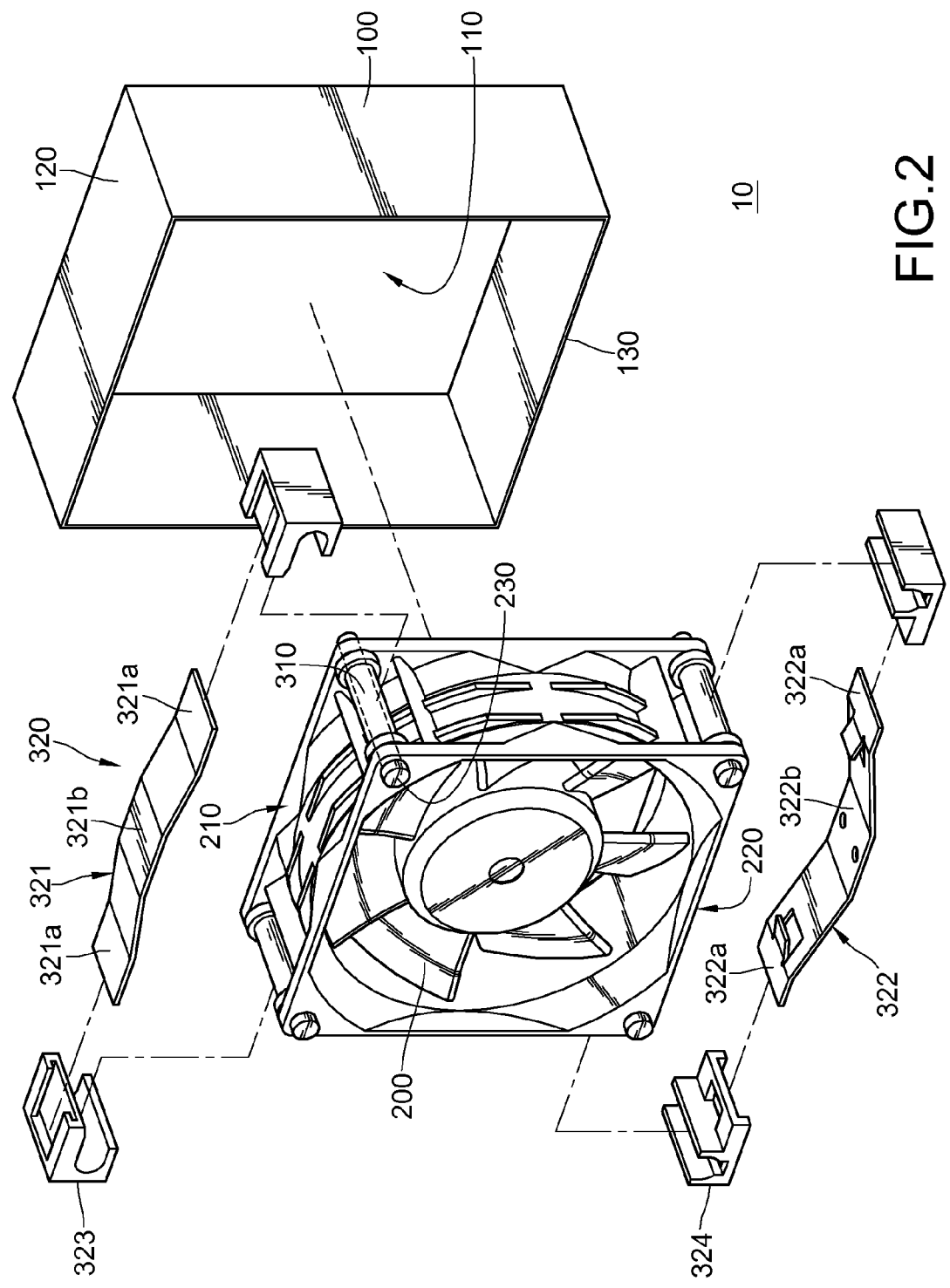
FIG. 2 is a partial exploded view of FIG. 1.
Figure 3:
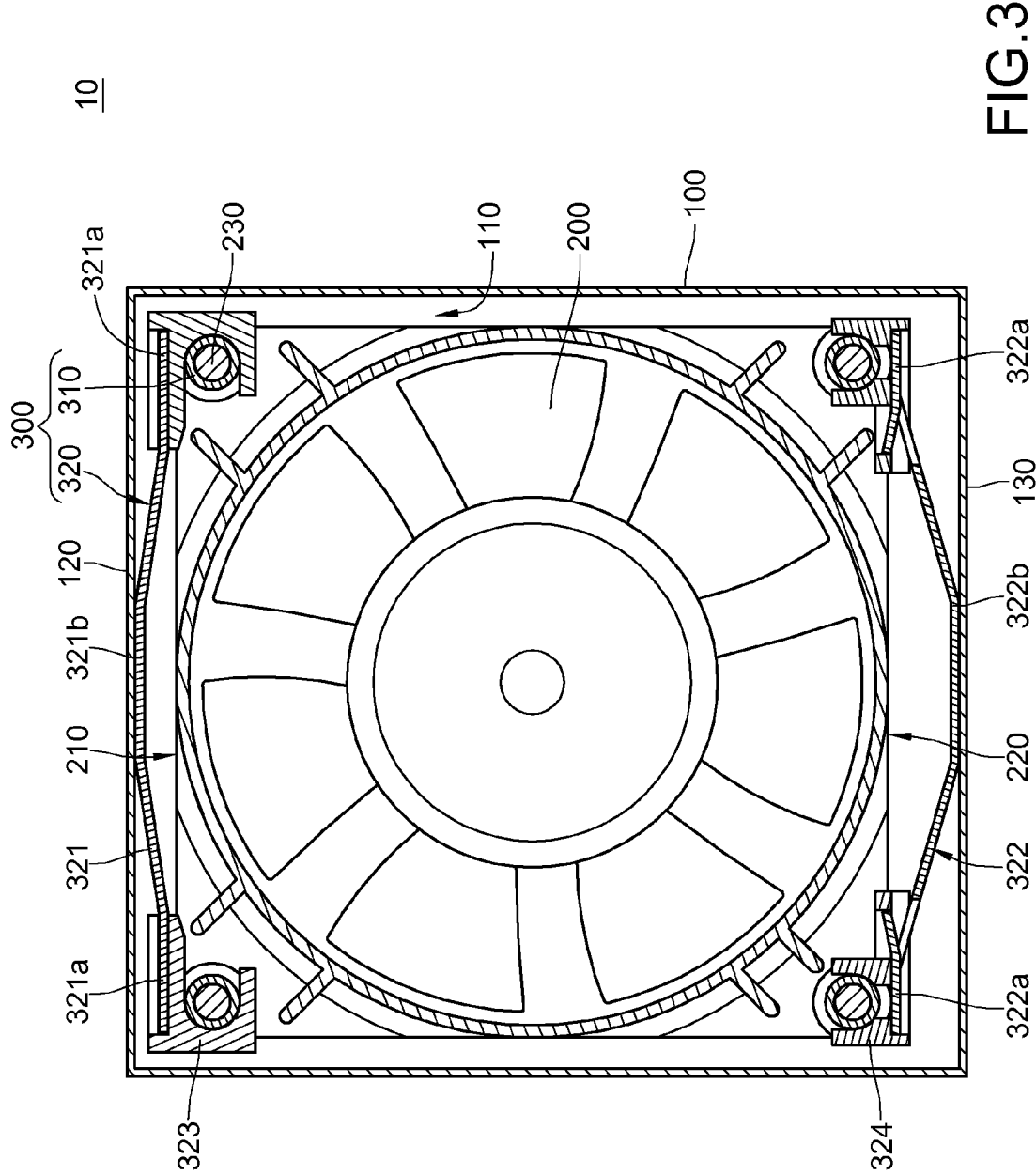
FIG. 3 is a sectional view for FIG. 1.

Please refer to FIG. 1 to FIG. 3, wherein FIG. 1 is a schematic perspective view for the fan module according to one embodiment of this disclosure, FIG. 2 is a partial exploded view of FIG. 1, and FIG. 3 is a sectional view for FIG. 1. The fan module 10 in this embodiment is suitable for installation in an electronic device, to dissipate heat generated by a heat source of the electronic device. The electronic device is, for example, a server. Generally, the server is provided with electronic components, such as a central processing unit or a display card, as well as hard disks for storing information.

The fan module 10 in this embodiment includes a casing 100, a fan 200, and two vibration absorption assemblies 300. The casing 100 has an accommodating space 110, a first lateral wall 120, and a second lateral wall 130. The accommodating space 110 is located between the first lateral wall 120 and the second lateral wall 130. The fan 200 is adapted for generating vibration waves during operation. The fan 200 is located in the accommodating space 110 and keeps a distance from the casing 100. In detail, the fan 200 is substantially connected to the first lateral wall 120 and the second lateral wall 130 via the two vibration absorption assemblies 300, respectively.

Each of the vibration absorption assemblies 300 comprises two first vibration absorption components 310 and a second vibration absorption component 320. The two first vibration absorption components 310 are respectively in contact with the fan 200 and are separated from the casing 100 respectively. The second vibration absorption component 320 is connected with the two first vibration absorption components 310 and one of the first lateral wall 120 and the second lateral wall 130. In this disclosure, the connection means a direct connection or an indirect connection. Moreover, in this embodiment, the first vibration absorption components 310 and the second vibration absorption component 320 are made from different materials. The first vibration absorption components 310 are made from, for example, rubber, used for absorbing vibration waves at a higher frequency range. The second vibration absorption component 320 is made from, for example, metal, used for absorbing the vibration waves at a lower frequency range. However, the arrangement order of the first vibration absorption components 310 and the second vibration absorption component 320 does not limit this disclosure. In other embodiments, the order of the first vibration absorption components 310 and the second vibration absorption component 320 can be reversed. Furthermore, in this embodiment, the first vibration absorption components 310 for absorbing the vibration waves at a higher frequency range are located at the side closer to the fan 200, thus the first vibration absorption components 310 can absorb vibration waves at a higher frequency range as early as possible such that the dispersing of the vibration waves at a higher frequency range along with the increase of transmission distance is reduced.

Furthermore, the fan 200 in this embodiment has a first side 210 and a second side 220 opposite to each other. The fan 200 further comprises four installation rods 230. Two of the installation rods 230 are assembled on the first side 210 and are separated at a distance from each other. The rest of the installation rods 230 are assembled on the second side 220 and are separated at a distance from each other.

The four installation rods 230 are respectively covered by the four first vibration absorption components 310. In addition, the fan module 10 further comprises two first assembly parts 323 and two second assembly parts 324. The two first assembly parts 323 are respectively connected with the two installation rods 230 of the first side 210, and the two second assembly parts 324 are respectively connected with the two installation rods 230 of the second side 220.

The two second vibration absorption components 320 are, respectively, a first elastic sheet 321 and a second elastic sheet 322. The first elastic sheet 321 projects towards the first lateral wall 120 from the first side 210 and contacts the first lateral wall 120. The second elastic sheet 322 projects towards the second lateral wall 130 from the second side 220 and contacts the second lateral wall 130. Typically, the first elastic sheet 321 includes a bending segment 321b and two connection segments 321a. The two connection segments 321a extend from two opposite ends of the bending segment 321b. The two connection segments 321a are respectively connected with two first assembly parts 323. Similarly, the second elastic sheet 322 includes a bending segment 322b and two connection segments 322a. The two connection segments 322a extend from two opposite ends of the bending segment 322b. The two connection segments 322a are respectively connected with the two second assembly parts 324 and therefore the bending segment 321b of the first elastic sheet 321 contacts the first lateral wall 120, and the bending segment 322b of the second elastic sheet 322 contacts the second lateral wall 130, thus the first vibration absorption components 310 and the second vibration absorption component 320 are connected to each other between the casing 100 and the fan 200, by the combination of the first assembly parts 323 and the second assembly parts 324.

In this embodiment and some other embodiments, the first vibration absorption components 310 and the casing 100 are separated from each other such that the first vibration absorption components 310 and the second vibration absorption component 320 are connected in series to each other between the casing 100 and the fan 200. Accordingly, the vibration waves generated by the fan 200 may be absorbed by the first vibration absorption components 310 and then the second vibration absorption component 320 in sequence. In this way, the intensity of the vibration waves transmitted to the casing 100 is greatly reduced. Furthermore, when the electronic device is equipped with the fan module 10 in this embodiment, most of the vibration waves are absorbed by the first vibration absorption components 310 and the second vibration absorption component 320, the rest of the vibration waves that are transmitted to the hard disk of the electronic device are relatively small, thereby reducing the impact on the hard disk from the vibration waves, and the hard disk can operate at a normal performance.

Figure 4:
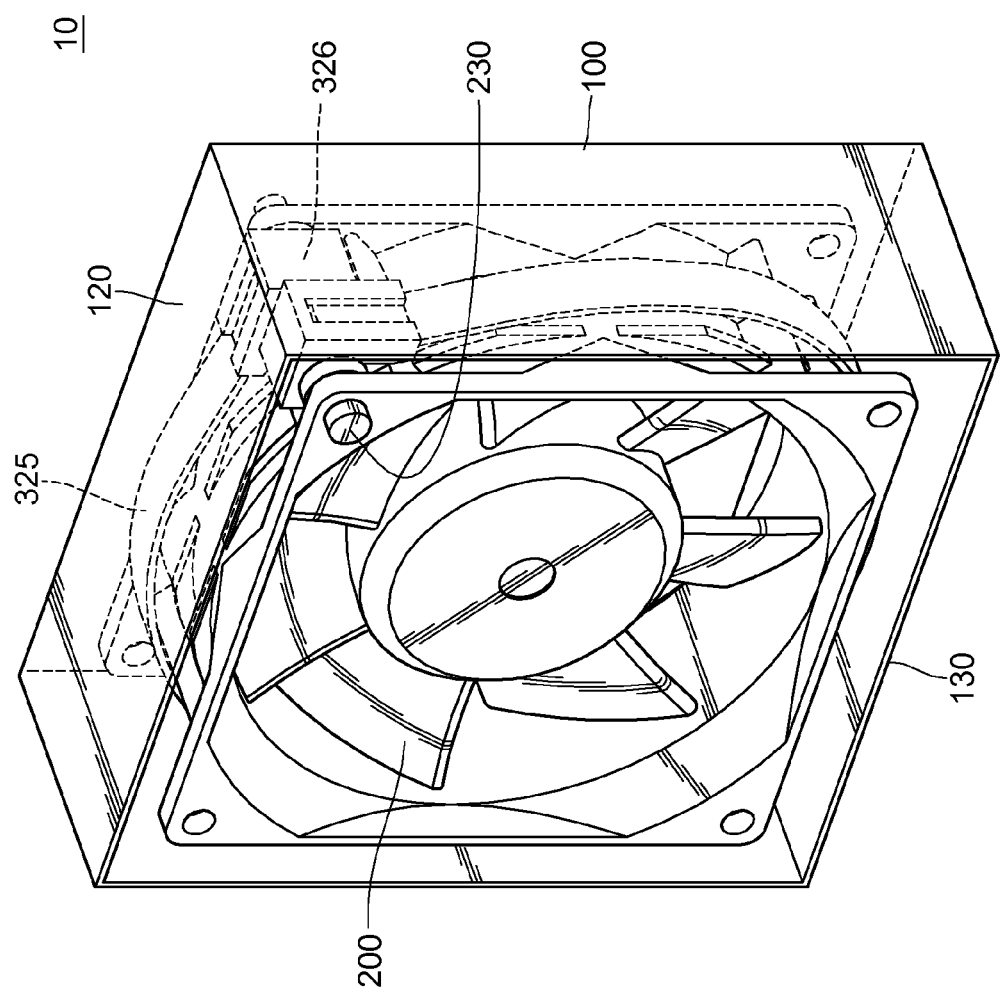
FIG. 4 is a schematic perspective view for a fan module according to another embodiment of the disclosure.
Figure 5:
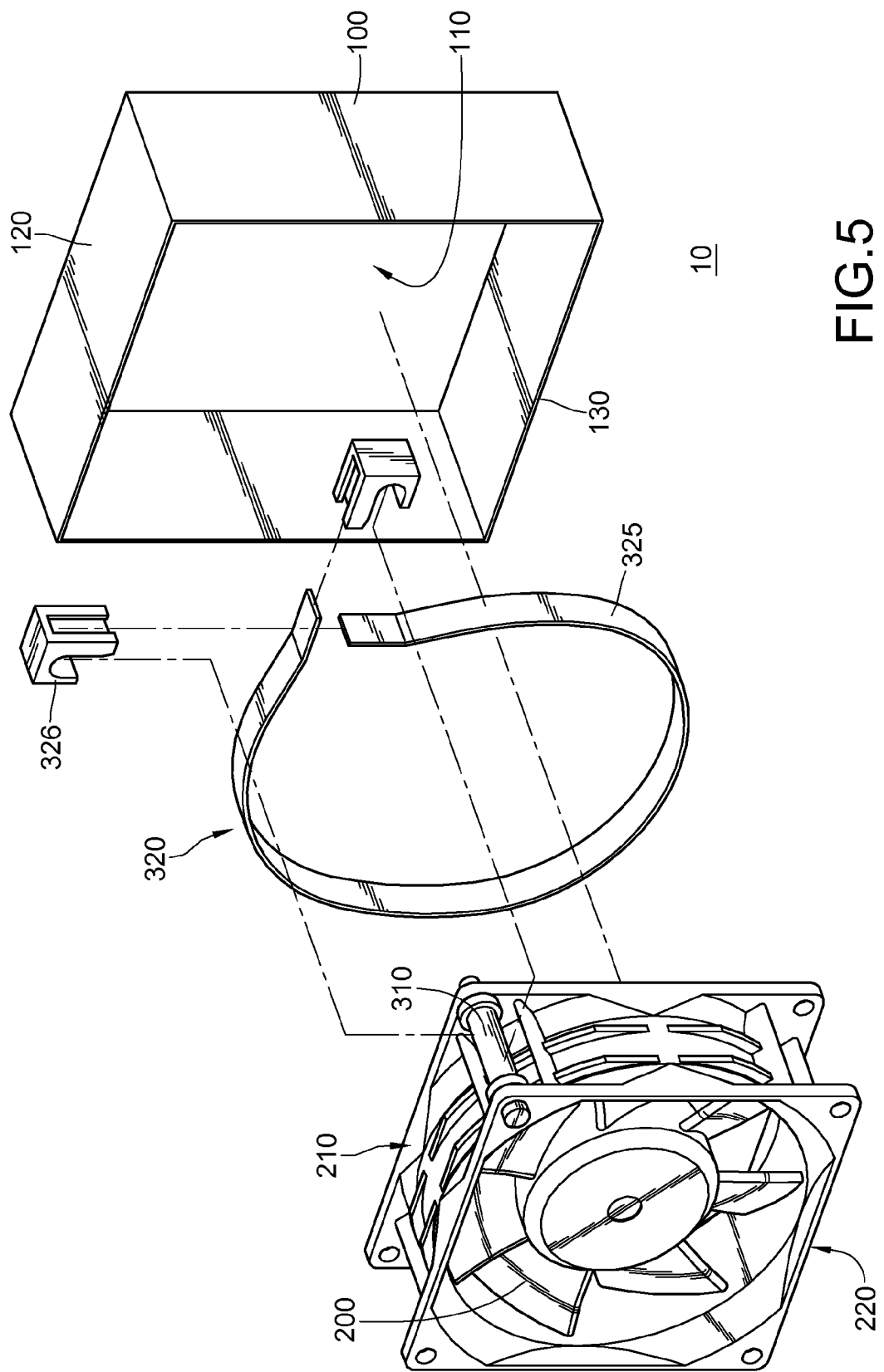
FIG. 5 is a partial exploded view of FIG. 4.
Figure 6:
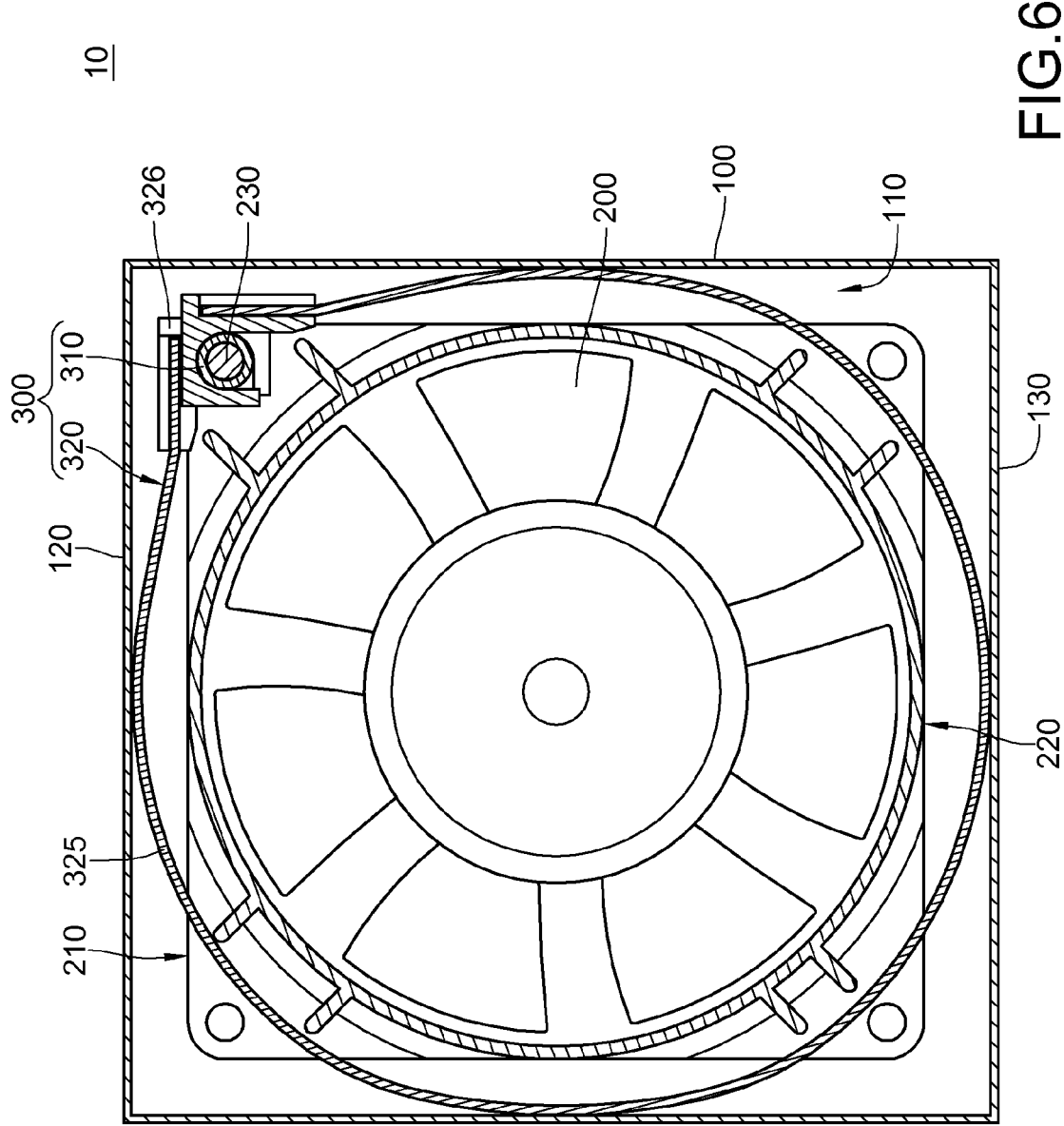
FIG. 6 is a sectional view of FIG. 4.

The two second vibration absorption components 320 in this embodiment are, respectively, a first elastic sheet 321 and a second elastic sheet 322, but such a design choice does not limit this disclosure. In other embodiments, the second vibration absorption components 320 can also include only one elastic sheet. Please refer to FIG. 4 to FIG. 6, where FIG. 4 is a schematic perspective view for the fan module according to another embodiment of the disclosure, FIG. 5 is a partial exploded view of FIG. 4, and FIG. 6 is a sectional view of FIG. 4. The configurations of all the elements and the design of the structure are the same as those in the previous embodiment of the disclosure, and only the differences will be described hereinafter.

A fan module 10 in this embodiment comprises a casing 100, a fan 200 and a vibration absorption assembly 300. The casing 100 has an accommodating space 110. The fan 200 is located in the accommodating space 110 and is separated at a distance from the casing 100. The first vibration absorption components 310 contact the fan 200, and are separated from the casing 100. The second vibration absorption components 320 are in contact with the first vibration absorption components 310 and the casing respectively, and the first vibration absorption components 310 and the second vibration absorption components 320 are adapted for absorbing the vibration waves with different frequency ranges from the fan 200.

In detail, the casing 100 includes a first lateral wall 120 and a second lateral wall 130 opposite to each other. The fan 200 is located between the first lateral wall 120 and the second lateral wall 130, and the fan 200 comprises an installation rod 230. The second vibration absorption component 320 includes a third elastic sheet 325 and two third assembly parts 326. The two third assembly parts 326 are connected with two opposite ends of the third elastic sheet 325 respectively. The installation rod 230 is covered by the first vibration absorption component 310. The third elastic sheet 325 is assembled along the circumference of the fan 200 (namely, the rim of the fan 200), and the two third assembly parts 326 are assembled on the installation rod 230. Typically, the third elastic sheet 325 encircles (i.e., surrounds) the fan 200. In addition to being in contact with the installation rod 230 via the two third assembly parts 326, the other portions of the third elastic sheet 325 are separated at a distance from the fan 200. Moreover, the third elastic sheet 325 also contacts the first lateral wall 120 and the second lateral wall 130 such that the first vibration absorption components 310 and the second vibration absorption component 320 are connected in series to each other between the casing 100 and the fan 200. Accordingly, the vibration waves, generated by the fan 200, are absorbed by the first vibration absorption components 310 and then the second vibration absorption component 320 in sequence. In this way, the intensity of the vibration waves transmitted to the casing 100 is significantly reduced.

According to the above mentioned fan module disclosed in this disclosure, the first vibration absorption components and the second vibration absorption components are connected in series between the casing and the fan, thus the vibration waves generated by the operation of the fan can be absorbed by the first vibration absorption components and the second vibration absorption components in sequence, thereby greatly reducing the impact on the casing from the vibration waves.

In addition, the first vibration absorption components are adapted for absorbing the vibration waves at a higher frequency range, and the first vibration absorption components are located at the side closer to the fan, thus the first vibration absorption components can absorb the vibration waves at a higher frequency range as early as possible. Therefore, the dispersing of the vibration waves at a higher frequency range along with the increase of transmission distance is reduced.

Moreover, most vibration waves are absorbed by the first vibration absorption components and the second vibration absorption component, and the rest of the vibration waves that are transmitted to the hard disk, of the electronic device, are relatively small, thereby reducing the impact on the hard disk from the vibration waves, and the hard disk can operate at a normal performance.

What is claimed is:

1. A fan module comprising:
   a casing having an accommodating space and comprising a first lateral wall and a second lateral wall opposite to each other, and the fan located between the first lateral wall and the second lateral wall;
   a fan located in the accommodating space and separated at a distance from the casing; and
   two vibration absorption assemblies, each of which comprises:
   two first vibration absorption components respectively in contact with the fan and separated from the casing respectively; and
   a second vibration absorption component connected with two first vibration absorption components and the casing respectively, and the first vibration absorption components and the second vibration absorption components being adapted for absorbing vibration waves having different frequency ranges;
   two first assembly parts connected with two of the four first vibration absorption components; and
   two second assembly parts connected with the rest of the four first vibration absorption components;
   wherein the fan has a first side and a second side opposite to each other and comprises four installation rods, two of the installation rods are disposed at the first side at a distance from each other, the rest of the installation rods are disposed at the second side at a distance from each other, the four installation rods are covered by the four first vibration absorption components, respectively, the two first assembly parts are assembled respectively on the two installation rods of the first side, the two second assembly parts are assembled respectively on the two installation rods of the second side, the two second vibration absorption components are, respectively, a first elastic sheet and a second elastic sheet, the first elastic sheet is assembled along the first side of the fan, two opposite ends of the first elastic sheet are connected to the two first assembly parts respectively, the second elastic sheet is assembled along the second side of the fan, two opposite ends of the second elastic sheet are connected to the two second assembly parts, respectively, the first elastic sheet is connected to the two first vibration absorption components located at the first side via the two first assembly parts, respectively, the second elastic sheet is connected to the two second vibration absorption components located at the second side via the two second assembly parts, respectively, two opposite ends of one of two second vibration absorption components are respectively connected with the two first assembly parts, and two opposite ends of the rest of the two second vibration absorption components are respectively connected with two second assembly parts.

2. The fan module according to claim 1, wherein the second vibration absorption component is separated from the fan.

3. The fan module according to claim 1, wherein the first elastic sheet projects towards the first lateral wail from the first side and contacts the first lateral wail, and the second elastic sheet projects towards the second lateral wail from the second side and contacts the second lateral wail.

4. The fan module according to claim 1, wherein both the first elastic sheet and the second elastic sheet include a bending segment and two connection segments extending from two opposite ends of the bending segment, respectively, the bending segment contacts the casing, and the two connection segments are fastened to the two installation rods, respectively.

5. The fan module according to claim 1, wherein the first elastic sheet and the second elastic sheet are both made of metal.

6. The fan module according to claim 1, wherein the first vibration absorption component is made of rubber.

* * * * *